455-605 AU 233 EX CROSS REFERENCE EXAMINER
FIP8106 XR 3,445,156

May 20, 1969 W. A. GANTZ 3,445,156

COLOR MODULATOR SYSTEM

Filed July 16, 1965

INVENTOR.
WILLIAM A. GANTZ
BY
Townsend and Townsend
ATTORNEYS

United States Patent Office 3,445,156
Patented May 20, 1969

3,445,156

COLOR MODULATOR SYSTEM

William A. Gantz, Berkeley, Calif., assignor to The Regents of the University of California, Berkeley, Calif.

Filed July 16, 1965, Ser. No. 472,565
Int. Cl. G02f *1/32;* H04b *9/00*
U.S. Cl. 350—285 5 Claims

ABSTRACT OF THE DISCLOSURE

A light modulating system in which light is projected on an angularly modulated mirror through a filter wedge and thence is reflected back along the optical axis of the light beam to project a beam of various intensity or color which is determined by the position of light transmission through the filter wedge.

Figure 1:
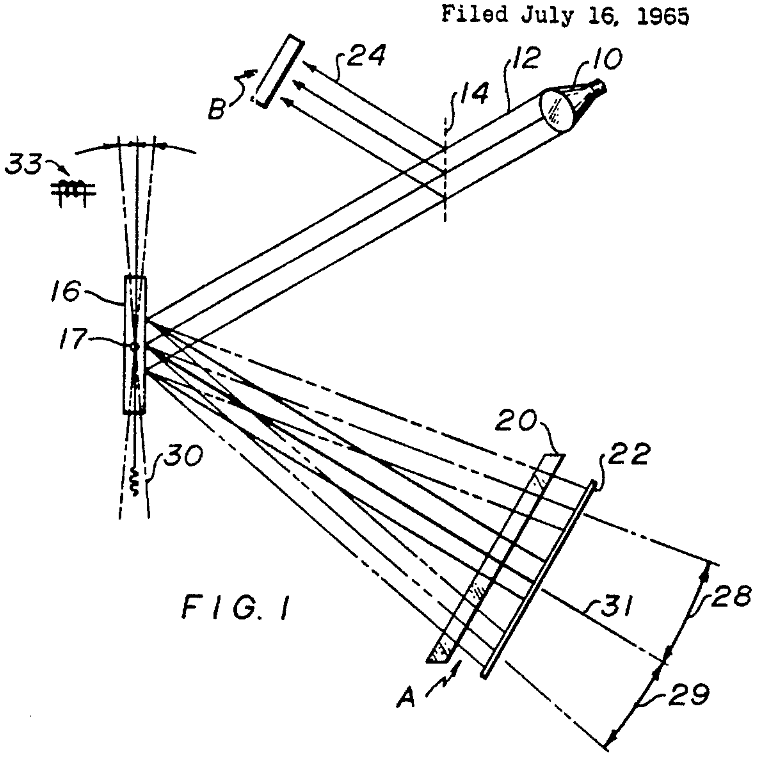

The invention relates to a system for color modulating a beam of light in accordance with the variations in a control signal.

It is desirable in systems where color modulation of light is employed to transmit signal information to provide a stationary color modulated output beam in order that the signal information may be utilized without compensating for output beam movement. One method of providing such a stationary output beam employs slitted apertures which compensate for the dispersion of light inherent in prismatic or grating light refraction. Unfortunately, the small slitted apertures required in such systems limit the intensity of the output beam of light too greatly for many applications.

In the present invention a stationary, color-modulated beam of light of relatively high intensity and of relatively large cross-sectional area can be acquired without slits.

It should be noted that two of the inherent limitations in systems employing prismatic and grating light refraction are the fixed ditsribution of the colors in the spectrum, and the blending of colors because of the continuous characteristic of the color distribution.

In this invention there is provided an improved signal controlled system for the color modulation of a beam of light in which the color shift for given signal variations is predetermined and may be varied as desired.

Still another object of this invention is to provide an improved color modulation system which is not limited in its efficiency by color blending, as acquired with prismatic refraction, and which provides color modulation of a beam of white light as a continuous or discontinuous function or can function to modulate in intensity alone or in combination with color value modulation.

A further object of this invention is to provide a color modulator system particularly suitable for the recording of sound or other signals on color film. In conventional black and white sound recordings, such as track density or track width type recordings, there is a tendency for discrimination of frequencies in the operating range. There may be introduction of false harmonics, and in general there may be tendencies to produce distortion and noise. These problems are minimized in systems using color modulation. The feasability of recording a beam of light which has been color modulated by prismatic or grating type refraction in conventional three color film is complicated by the color response of the film being incompatible with the color blending and the color dispersion inherent in prismatic color modulation. The color modulation acquired by the present invention can be compatible with any color film by employing color filters formed to provide a color wedge having a color distribution compatible with the film's color sensitivity.

Another object of the invention is to provide a device which utilizes light arranged to project onto a reflecting surface in a scan path. The reflected light is filtered to the desired color and/or intensity content by a filter graduated in a predetermined color distribution and directed to a fixed location for utilization. The color content of the filtered light is thus determined by the area of the filter impinged by the light, and the filter scanning is in turn determined by the position of the reflecting system, which may be mechanically or electrically controlled as desired.

Still further, the light beam employed is caused to emanate at a point position by retaining the light beam within a common path in transmission towards and back from the filter so that optical means located within the emanating path can withdraw modulated light without angular variations and project it at a constant point in the target area.

To this end the beam of light is transmitted through a partially silvered mirror which is arranged to transmit approximately one-half of the light through the mirror to a signal controlled movable reflecting mirror which directs the beam to a filter. The filter beam is reflected back in the same path to the movable mirror and thence to the partially silvered mirror which will reflect approximately one-half of the beam to a target area.

Other objects and advantages of the present invention, such as providing color modulator systems adaptable for application in color separation work in the graphic arts, since a beam of light sufficiently large in diameter may be provided, will become apparent upon reading the following specification and referring to the accompanying drawings in which similar characters of reference represent corresponding parts in each of the several views.

Figure 2:
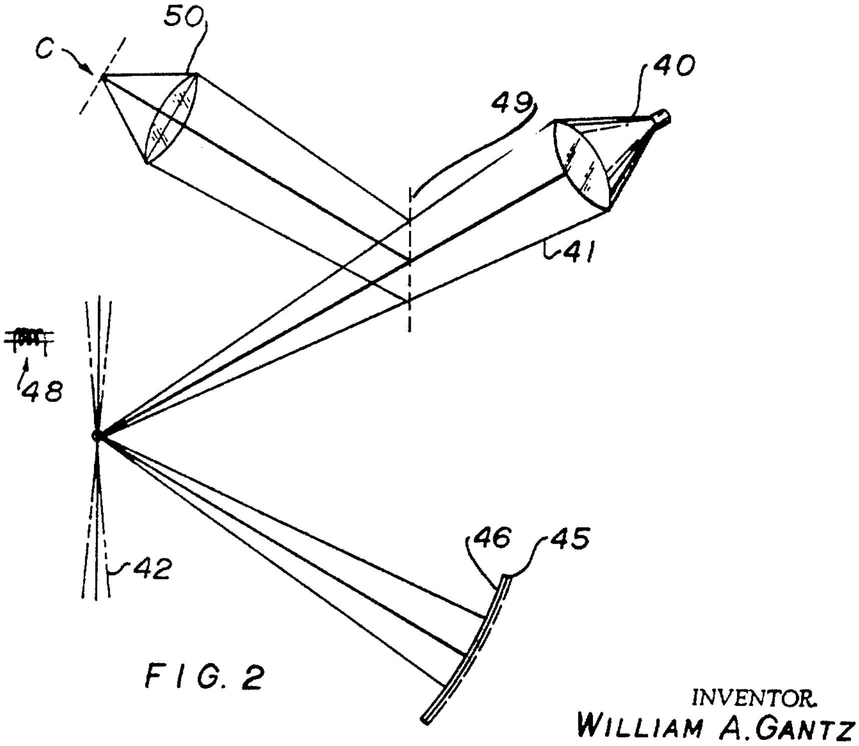

In describing the invention, reference will be made to the drawing in which:

FIG. 1 is a schematic diagram of a color modulation system embodying the invention; and FIG. 2 is a schematic diagram of an alternate color modulation system.

Referring now to the drawing and with particular reference to FIG. 1 the color modulation system of the present invention comprises a source of light 10 arranged to project light beam 12 through a partially silvered mirror 14. Partially silvered mirror 14 is arranged to transmit approximately one-half of the light through the mirror and to reflect the other half from the surface of the mirror. Interposed in beam 12 is a mirror 16 pivotally mounted at 17 and positioned to reflect beam 12 toward a modulating station generally indicated at A. The modulating station comprises a filter 20 backed by a retrodirective reflecting surface 22 and positioned to return light from mirror 16 to the point of emanation from mirror 16. The beam so returned is directed to partially silvered mirror 14 for reflection out in beam 24 to a target station B.

Beam 12 from light source 10 is collimated by the use of appropriate lenses to project the center of the beam at a position aligned with the axial alignment of pivot point 17. Thereafter, when mirror 16 is rocked or rotated, the reflected beam onto modulating station A will traverse a scan path on either side of center as indicated by the two arrows 28 and 29. Reflecting surface 22, as previously described, is positioned normal to the axis of light impingement on the mirror from movable or modulating mirror 16 in order to cause the return of the light to the same place from which it emanates. Mirror 16 and light source 10 are disposed in similar angular relationship so that light reflected back from reflecting surface 22 will travel along the same axis as the light emanating from light source 10. Thus, the projected light in path 12 emanating from light source 10 to mirror 16 and thence to the color modulating station A will be in an identical axial alignment with the returned beam of light reflected from fixed reflecting surface 22. It can thus be seen that the light diverted in the return direction from mirror 16 will retain the angular position when impinged on target area B. This relationship is important where the color modulation is to be utilized for recording at a point target which may comprise for example a moving unexposed film strip or other target applications. Color or intensity modulation is effected by filter 20. The filter is formed with gradations of color which can be varied progressively from one color to another, or which may alternatively or in addition be wedged in density.

Filter 20 is mounted in parallel alignment with the face of the fixed reflecting surface 22 in such a condition that light will pass through the filter from movable mirror 16 in exactly the same position that it will be returned through the filter when reflected back by fixed reflecting surface 22. This is important to eliminate ambiguity that could result from light passing in one direction through the filter being at a different position than light passing in the opposite direction through the filter. Mirror 16 is biased by a spring 30 in its normal position which will cause beam 12 to be projected at a medium point on reflecting surface 22 indicated at 31. Spring 30 thus functions as a bias return to maintain the mirror in the normal or middle position. A solenoid 33 is arranged to move the mirror about its pivotal axis 17 in accordance with electrical input information imposed upon the solenoid. The modulation of the mirror thus is analogous to sound transducers, such as loudspeakers and the like, wherein the mechanical translation of mirror movement is substantially the equivalent to cone movement within a loudspeaker. It is believed obvious that other means for modulating the mirror can alternatively be equally well employed as needs indicate.

It can be seen that the aforesaid system causes light modulation directly proportional to the filter characteristic along the scan path. Thus, output beam 29 will be formulated in a point relation at target area B and will vary in either intensity or in color in accordance with the instantaneous position of light transmission through the filter. Thus, movement of mirror 16 will cause color value shifts in accordance with the color changes along the scan path of filter 20. In some applications it may be desirable to color modulate a particular type of photographic film. All color film emulsions have color sensitivities which are peculiar to the chemistry of the emulsions and the processing. It can be seen, therefore, that filter 20 can be initially prepared from an emulsion identical to the emulsion upon which the recording is to be made, and if developed under substantially identical developing conditions it can be seen that the color balance peculiarities of the film can be made self-compensating, thus insuring a light output to the recording station of an intensity and color value which is identically compatible with the film upon which the recording is to be made.

In FIG. 2 there is provided another embodiment of the invention in which a light source 40 is arranged to project a beam 41 onto a mirror 42 constructed and arranged in a manner identical to that shown in FIG. 1 for projection onto a concave mirror 45. Mirror 45 is arranged with a transparent filter coating 46 over the face of the mirror, or can alternatively be arranged with a reflective surface having predetermined color characteriseics for reflection back of color content or value as required. It can also be seen that the mirror can be formed with a surface having gradations of reflectivity which will result in intensity modulation of the signal when mirror 42 is rocked by its modulation mechanism 48. Light is returned in the same manner as indicated in the discussion of FIG. 1 by the use of a partially silvered mirror 49 to a lens system 50 and thence to a target area C for recording or other utilization.

It can be seen in the system of the aforesaid invention that there are no restrictions with respect to light intensity due to the ability of the system to use large aperture optics. It can further be seen that the system has the advantage of providing output beam widths to either large or restricted areas depending upon the optical requirements and end uses sought.

While several embodiments of the present invention have been shown and described it will be obvious that other adaptations and modifications may be made without departing from the true spirit and scope of the invention.

What is claimed is:

1. A light modulation system comprising a source of light projecting a first beam, movable reflector means mounted to receive said first beam and to reflect therefrom a second beam, fixed reflector means mounted at an angle to receive light of said second beam and reflect the light received thereby back to said first reflector means in a direction axially aligned with said second beam, said movable reflector means aligned to reflect back the light from said fixed reflector means in axial alignment with said first beam toward said light source, means moving said movable reflector means in a direction to cause the second beam to sweep across an area of said fixed reflector means, light modifying means including a filter wedge having a gradual progressive changing gradation of light transmissivity values extending from one end of the filter to the other associated with said fixed reflector means and disposed in the sweep path of said second beam in position whereby the light modifying values vary at predetermined positions along the area of the sweep path to change the lght value in accordance with the instantaneous position of the beam with respect to the light modifying means, and receiving means mounted within the light path of said first beam to deflect the light transmitted back from said movable reflector at an angle out of axial alignment with said first beam.

2. A light modulating system according to claim 1 and wherein said light modifying means comprises a light transmitting filter located within the light path of said second beam.

3. A light modulating system according to claim 1 and wherein said light modulating means comprises a facing on said fixed reflector means.

4. A light modulating system according to claim 1 and wherein said light modifying means includes a color wedge having gradually changing color characteristics extending along the sweep path.

5. A light modulating system according to claim 1 and wherein said receiving means includes an unexposed colored film having a predetermined unexposed color emulsion and wherein said light modifying means comprises an exposed and developed film having an image comprising a gradual gradation of varying colors extending along the line of the sweep path in which said film is formed of the same type of emulsion as said filter.

References Cited

UNITED STATES PATENTS

| | | | |
|---|---|---|---|
| 1,885,098 | 10/1932 | Hill | 250—230 X |
| 2,629,778 | 2/1953 | Potter. | |
| 2,945,132 | 7/1960 | Schüch | 250—230 X |
| 3,114,284 | 12/1963 | Vargady | 346—109 X |
| 3,144,807 | 8/1964 | Coombs | 350—285 X |
| 3,243,821 | 3/1966 | Bogs et al. | 346—109 |

RONALD L. WIBERT, *Primary Examiner.*

T. MAJOR, *Assistant Examiner.*

U.S. Cl. X.R.

250—199